United States Patent [19]
Yamagata et al.

[11] B 3,914,479
[45] Oct. 21, 1975

[54] PROCESS FOR MANUFACTURING LEATHER-LIKE MATERIALS

[75] Inventors: Mineo Yamagata; Akira Akamatsu; Kazushi Togo, all of Kawasaki, Japan

[73] Assignee: Ajinomoto Co., Inc., Tokyo, Japan

[22] Filed: June 23, 1972

[21] Appl. No.: 265,727

[44] Published under the Trial Voluntary Protest Program on January 28, 1975 as document no. B 265,727.

[30] Foreign Application Priority Data
July 2, 1971    Japan.............................. 46-48652

[52] U.S. Cl. ................ 427/390; 428/290; 428/291; 428/904; 260/2.5 AY; 260/6; 260/8; 264/41
[51] Int. Cl.² .. D06N 3/00; B32B 5/18; B29D 27/00
[58] Field of Search................... 117/135.5, 63, 164; 264/41; 260/2.5 AY, 6, 8; 427/390; 428/290, 291, 904

[56] References Cited
UNITED STATES PATENTS

| | | | |
|---|---|---|---|
| 2,632,740 | 3/1953 | Schibler................................. | 260/6 |
| 3,369,925 | 11/1968 | Matsushita............................ | 117/63 |
| 3,522,201 | 7/1970 | MacNair............................... | 117/63 |
| 3,554,789 | 1/1971 | Kigane............................. | 117/135.5 |
| 3,582,397 | 6/1971 | Shibata............................ | 117/140 A |
| 3,582,442 | 6/1971 | Kaneko................................... | 260/6 |
| 3,634,544 | 1/1972 | Takeda.......................... | 260/2.5 AY |
| 3,676,206 | 7/1972 | Nishitani.............................. | 117/63 |

OTHER PUBLICATIONS

Central Patents Index (CPI) Abstract 46842S, Derwent Publications, London, 9–10–71.
G. Trappe, "Polyurethane Elastomers" in Advances in Polyurethane Technology, Buist et al., eds. McClaren & Sons, London, 1968, pp. 25–33.

*Primary Examiner*—William D. Martin
*Assistant Examiner*—William H. Schmidt
*Attorney, Agent, or Firm*—Hans Berman; Kurt Kelman

[57] ABSTRACT

A gas-permeable, leather-like material is obtained by coating a fibrous base with a heterogeneous mixture of a liquid and two polymers, or by impregnating the base material with the mixture, and thereafter drying the coated or impregnated material until the liquid is removed. The two polymers are a polyamino acid and an elastomer respectively, at least one of the polymers being present in the mixture as a separate, dispersed phase.

7 Claims, No Drawings

PROCESS FOR MANUFACTURING LEATHER-LIKE MATERIALS

The present invention relates to a process for manufacturing leather-like materials and particularly a leather-like material, which resembles a natural leather and which is excellent in gas-permeability.

In order to produce the gas-permeable, porous and leather-like materials the following processes and their varieties have been hitherto performed:

a. The process that cloths such as unwoven cloths, fabrics and paper cloths are coated or impregnated with a resin solution, for example, a solution of polyurethane, polyacrylic ester and the like, and then the cloths treated thus are immersed into a certain solvent, which is not miscible with the solvent of the said resin solution and which does not dissolve the said resins, to coagulate and fix the resin on the cloths.

b. The process to form a gas-permeable porous layer by heating to expand the resins in which a certain foam agent is mixed.

c. The process to coat cloths with resin solutions in which foreign substances such as fibrous materials, pigments and inorganic materials are mixed.

However, all of these processes have been unsatisfactory, because they are complicated, cause difficulties in handling the machines and produce a product which is far from natural leather in quality.

It has now been found that a leather-like material quite different from the material prepared by the conventional wet process, having a soft touch based on a special porous structure, similar to natural leather, and superior in mechanical strength and adhesiveness can be prepared by coating or impregnating a fibrous base with a turbid and heterogenous mixture mainly consisting of polyamino acid, elastomer and a solvent, and removing the solvent. Without the combination of polyamino acid and rubber-like elastomer, a leather-like material satisfactory in gas-permeability, softness, touch and mechanical strength, is not obtained. This is thought to be due to the tendency of the polyamino acid to denature or gel and due to the superior properties of the elastomer such as excellent strength and elongation and good adhesiveness.

If the mixture of polyamino acid and elastomer is a homogeneous solution, or the polyamino acid is mixed with a polymer other than an elastomer, for example, thermoplastic resins such as polyvinyl acetate, rigid polyvinyl chloride, cellulose triacetate, or thermosetting resins such as urea resin, melamine resin, epoxy resin and phenol resin, the gas-permeable and porous leather-like material is not obtained. Although the reason of these phenomena is not clear, the desired effect might be caused by the independent properties of polyamino acid and rubber-like elastomer which are present in different phases in the turbid and heterogeneous mixture. On the other hand, in a homogeneous solution of polyamino acid and elastomer, the peculiar properties of polyamino acid would be eliminated or diminished by the interaction of both polymers.

It is surprising that the mixture of polyamino acid and rubber-like elastomer, which gives neither an ordinary film nor a gas-permeable film when deposited on a glass plate produces a gas-permeable and porous leather-like material if it is coated over fibrous material or is impregnated into that material and is dried to remove the solvent.

The polyamino acids suitable for this invention are polymers of the following amino acids: Neutral amino acids such as glycine, alanine, leucine, isoleucine, valine, methionine, phenylalanine, etc.; ω-alkyl esters of acidic amino acid such as β-alkyl aspartate, γ-alkyl glutamate, etc.; ω-acyl derivatives of basic amino acid, such as δ-acyl ornithine, ε-acyl lysine, etc.; and α-amino acids having protected active groups other than amino group and carboxy group, for example, O-benzyl serine, O-acyl serine, O-acyl threonine, O-benzyl tyrosine, S-benzyl cystine and the like, or β-amino acids such as β-alanine and the like.

The polyamino acids suitable for this invention are homopolymers consisting of one of these amino acids or copolymers of at least two different amino acids and mixtures of at least two of said homopolymers and copolymers, and furthermore, polymers having constituents other than amino acids within the main molecular chain of polyamino acids of course belong to the polyamino acid described herein. These amino acids can be optically active or inactive.

A suitable elastomer will be defined by a second order transition point below ordinary temperature. These elastomers are as follows: Natural rubber and synthetic rubber such as nitrile-butadiene rubber, styrene-butadiene rubber, polyisoprene, neoprene chlorosulfonated polyethylene, etc., and synthetic resins such as, polyurethane resin, polyacrylic ester resin, methoxy-methylated nylon 6 and the like.

The turbid and heterogenous, liquid mixture is produced by mixing polyamino acid, elastomer and solvent in the proper proportion and by agitating them at ordinary or elevated temperature. Additives such as plasticizer, filler, delustering agent etc., may be mixed with the heterogeneous mixture, and a small amount of polymers other than polyamino acid and elastomer may be also mixed in. The order of mixing the polyamino acid, elastomer and solvent is irrelevant.

Solvents used as carriers for the mixtures of polyamino acid and elastomer include: Hydrocarbons such as benzene, toluene, xylene, cycrohexane, n-hexane, etc.; halogenated hydrocarbons such as monochlorobenzene, methylene chloride, chloroform, ethylene dichloride, methyl chloroform, 1.1.2 - trichloroethane, 1.1.2.2 - tetrachloroethane, perchloroethylene, etc.; ketones such as acetone, methyl ethyl ketone, methyl isobutyl ketone, cyclohexanone, etc.; esters such as methyl acetate, ethyl acetate, n-propyl acetate, methyl propionate, etc; amides such as N.N-dimethyl formamide, N-methyl pyrrolidone, etc.; and ethers such as ethyl ether, dioxane, tetrahydrofuran, etc.

A mixture of some of these solvents with others which are non-solvents for the polyamino acid and/or the elastomer, such as methyl alcohol, ethyl alcohol, water, etc., may also be used. Especially, addition of a non-solvent for the polyamino acid makes the resin layer porous and gas-permeable.

The viscosity of the mixture should be between 10 and 100,000 centipoise, however, is not always limited within the said value if the coating and impregnation methods are properly designed. The concentration of solid matter in the mixture is selected so that the mixture is translucent or opaque, however, too concentrated mixtures tend to gel and the viscosity of very dilute mixtures is too low. The mixture thus should have a content of solid matter between 2 and 50 percent.

The mixture may separate into two layers after standing for a long time, have the appearance of a multi-dispersion system of fine particles, or only the polyamino acid may assume a semi-gelation state. After a turbid and heterogeneous, liquid mixture of polyamino acid and elastomer has been prepared, the solution is coated over the base cloth or impregnated into it. Raised cloth, non-woven cloth, knitted cloth and other fabrics are used as the base cloths. The base may consist of natural fibers such as cotton, hemp, wool, silk, etc.; regenerated fibers such as staple rayon fiber, etc.; and synthetic fibers such as polyamide, polyester, polyacrylonitrile, polyvinyl chloride, vinylon and the like.

A doctor knife coater, reverse roll coater, floating knife coater, etc., is used for coating. If the viscosity of resin solutions is low, the base cloths are immersed into the resin solution to impregnate them with it. After coating or impregnation, the solvent of the resin mixture is vaporized by drying. The leather-like materials thus obtained have sufficient strength for use, good gas-permeability and excellent touch.

EXPERIMENTAL EXAMPLE

Preparation of the heterogeneous, liquid mixture of polyamino acids and elastomers A. A solution consisting of 10 parts of "Paraprene pellet 22S" (trade name, the product of Nippon Polyurethane Industry Co., Ltd., thermoplastic polyurethane elastomer) and 90 parts of tetrahydrofuran was added to 100 parts of a solution consisting of 90 parts of ethylene dichloride and 10 parts of poly-γ-methyl-D-glutamate ($[\eta] = 1.02$) prepared by the polymerization of γ-methyl-D-glutamate N-carboxyanhydride. A semitransparent solution of 6,200 cps was obtained after stirring for 3 hrs. By coating the solution on a glass-plate and drying it, granular pieces appeared and no film was obtained.

B. A semitransparent solution of 780 cps. was obtained by mixing and stirring 40 parts of a solution consisting of 95 parts of ethyl acetate and 5 parts of poly-γ-ethyl-D-glutamate N-carboxyanhydride, 180 parts of a solution consisting of 35 parts of ethyl acetate and 10 parts of "Nippollan 5032" (trade name, the product of Nippon Polyurethane Industry Co., Ltd., a solution of cross-linking type polyurethane resin), 2.5 parts of "Coronate L" (cross-linking agent), and 2 parts of "NY-2" (cross-linking catalyzer). This was a heterogeneous multi-phase mixture containing two kinds of fine liquid particles. No film was obtained by coating the solution on a glass-plate and drying it.

C. 140 Parts of Marpozol NC-12 (trade name, the product of Matsumoto Yushi Seiyaku Co., Ltd., a solution of polyacrylic acid esters resin) and 300 parts of a solution consisting of 90 parts of benzene and 10 parts of L-leucine-DL-methionine copolymer ($[\eta] = 0.68$) prepared by copolymerization of L-leucine N-carboxyanhydride and DL-methylonine N-carboxyanhydride (mole ratio = 1/1) in benzene, were mixed, diluted with 30 parts of methanol and 30 parts of benzene and stirred for 3 hrs. A semitransparent solution was obtained and it showed analogous characteristics to the solution in (B) and separated into two layers after standing for a week.

D. 100 parts of a solution consisting of 90 parts of ethylene dichloride and 10 parts of poly-γ-isopropyl-D-glutamate ($[\eta] = 0.98$) prepared by polymerization of γ-isopropyl-D-glutamate N-carboxyanhydride, and 15 parts of "Neoprene AD" (trade name, Showa Neoprene Co., Ltd., neoprene rubber) masticated by mixing roller before use, were mixed, stirred for 24 hrs. and diluted with 35 parts of ethyl acetate and 50 parts of ethylene dichloride to give a semitransparent and heterogeneous liquid mixture.

E. 850 parts of a solution consisting of 90 parts of ethylene dichloride and 10 parts of poly-β-methyl-L-aspartate ($[\eta] = 0.73$) prepared by polymerization of β-methyl-L-aspartate N-carboxyanhydride, 15 parts of JSR-N-230S (trade name, Japan Synthetic Rubber Co., Ltd., acrylonitrile-butadiene rubber), 15 parts of methyl ethyl ketone and 10 parts of ARS 2075 red (trade name, Dainichiseika Color & Chemicals Mfg. Co., Ltd., coloring agent) were mixed and stirred for 20 hrs. to give a heterogeneous red liquid.

F. 30 parts of a solution consisting of 90 parts of ethylene dichloride and 10 parts of poly-ε-carbobenzoxy-L-lysine ($[\eta] = 0.56$) prepared by polymerization of ε-carbobenzoxy-L-lysine N-carboxyanhydride, 10 parts of JSR-1500 (trade name, Japan Synthetic Rubber Co., Ltd., styrene-butadiene rubber), 10 parts of toluene and 50 parts of ethylene dichloride were mixed and stirred to give a heterogeneous semi-transparent liquid.

G. 5 parts of a solution consisting of 60 parts of ethylene dichloride and 40 parts of Hypalon-20 (trade name, Showa Neoprene Co., Ltd., chlorosulfonated polyethylene), and 180 parts of a solution consisting of 90 parts of ethylene dichloride and poly-γ-methyl-D-glutamate ($[\eta] = 1.02$) were mixed and stirred to give a solution of 16,400 cps. This solution separated into two layers after standing for a week, and gave a heterogeneous disconnected film when coated on a glass-plate and dried.

The composition and the appearance of mixtures mainly consisting of polyamino acids and elastomers prepared in (A) – (G) is summarized in Table 1.

Table I

| No. | Polyamino acids | Elastomers | Solid ratio(a) | Viscosity | Concentration | Appearance |
|---|---|---|---|---|---|---|
| (A) | Poly-γ-methyl-D-glutamate | Thermoplastic polyurethane | 1/1 | 6,200 cps | 10 | Semitransparent |
| (B) | Poly-γ-ethyl-D-glutamate | Cross-linking type polyurethane | 1/9 | 780 | 10.7 | do. |
| (C) | Copoly-L-leucine-DL-methionine | Polyacrylic acid esters | 3/9 | 3,000 | 20 | do. |
| (D) | Poly-γ-isopropyl-D-glutamate | Neoprene rubber | 2/3 | 9,700 | 12.5 | do. |
| (E) | Poly-β-methyl-L-aspartate | Acrylonitrile-butadiene rubber | 85/15 | 10,100 | 11.3 | Red |
| (F) | Poly-ε-carbobenzoxy-L-lysine | Styrene-butadiene rubber | 3/10 | 16,400 | 13 | White |
| (G) | Poly-γ-methyl-D-glutamate | Chlorosulfonated polyethylene | 9/1 | 21,000 | 10.8 | Semitransparent |

(a) Weight ratio of polyamino acids to elastomers in solid matter.

EXAMPLE 1

The mixture (A) in the Experimental Example was spread on a raised cotton cloth (2/1 diagonal cloth composed of No. 30 count twines in the warp and No. 10 count singles in the woof was raised to 0.9 ±0.1 mm thickness) at a velocity of 1 m/min. with an aid of a doctor knife coater having slit width of 0.3 mm. The amount of applied mixture was 300 g/m². Then, the coated cloth was dried at 80° – 100°C. for 8 minutes. The product obtained was a porous artificial leather having good gas permeability and was closely similar to the natural leather in appearance and touch.

Also, this product withstood 10,000 cycles in the Scott type scratching resistance test (Japanese Industrial Standards K-6772) and 5,000 cycles in the MIT type bending resistance test (Japanese Industrial Standards P-8115), and its mechanical strength was satisfactory. The moisture permeability of the product was 6,900 g/m²/24 hrs. as measured according to Japanese Industrial Standards Z-0208.

EXAMPLE 2

In the mixture (B) in the Experimental Example were immersed raised vinylon-rayon plain fabrics (plain fabrics composed of No. 20 count singles in the warp and No. 20 count twines in the woof was raised up to 0.8 ± 0.1 mm thickness) and the pickup was adjusted to 500 g/m² between two rollers. The coated fabric was passed at a velocity of 0.5 m/min. through a 80° – 100°C hot-air oven of 5 m length and of 3 m/sec. wind velocity to evaporate the solvent completely. On the product obtained was spread each of the six mixtures (A), (C), (D), (E), (F) and (G) at a rate of 300 g/m² with a reverse roll coater. The six artificial leathers obtained after drying were porous materials of very good gas permeability and had soft and natural, leather like touch and satisfactory mechanical properties. They were most suitable as instep straps for shoes and artificial leather for clothing.

The physical properties, appearance and touch of the six artificial leathers are shown in Table 2.

EXAMPLE 3

The solution of polyacrylate "Marpozol NC-12" employed in Experimental Example (C) was evaporated to dryness and the solid polyacrylate resin obtained was again dissolved in 1,2-dichloroethane to prepare a 30 percent by weight solution of solid material. This solution was mixed with a 10 percent by weight solution of the poly-γ-methyl-D-glutamate in 1,2-dichloroethane which was employed in Experimental Example (A), in various proportions as shown in Table 3 and stirred together to prepare homogeneous solutions or heterogeneous mixtures.

The liquids were spread on a raised cotton cloth as in Example 1 and dried. The gas permeability and touch of the artificial leathers obtained are shown in Table 3.

As is apparent from data in Table 3, the use of heterogeneous polyamino acid-elastomer mixtures gives artificial leather combining good gas permeability and smooth touch, while the use of homogeneous mixed solutions results in the preparation of unsatisfactory artificial leather having no gas permeability.

EXAMPLE 4

The artificial leather obtained in Example 2 was dyed with an acid dyestuff "Solar Cyanine 6B" (trade name, a product of Sumitomo Chemical Co., Ltd.). On the surface of the dyed product, a 10 percent by weight solution of poly-γ-methyl-D-glutamate in 1,2-dichloroethane and a 10 percent by weight methanol solution of "Torezine F" (trade name, a product of Sanyo Chemical Industries, Ltd., methoxymethylated nylon-6) were applied alternatively in an amount of 5 g/m² respectively with a gravure coater. This surface treatment procedure was repeated three times and there was obtained artificial leather having good touch and beautiful colour.

EXAMPLE 5

The mixture (D) in the Experimental Example was diluted two times with 1,2-dichloroethane and sprayed on non-woven "Vilene NC-90" (a product of Japan Vilene Co., Ltd.) in an amount of 600 g/m² with an airless spray gun and dried. There was obtained a porous artificial leather having gas permeability.

The moisture permeability of this product was 4,000 g/m²/24 hrs. according to Japanese Industrial Standards Z-0208. In a Scott scratching resistance test, no change was observed after 5,000 cycles.

REFERENTIAL EXAMPLE 1

100 Parts of "NIPPOLLAN 5103" (trade name, a product of Nippon Polyurethane Industry Co., Ltd., a one component system polyurethane resin solution), 100 parts of a 10 percent by weight tetrahydrofuran solution of "Geon 121" (trade name, a product of the Japanese Geon Co., Ltd., polyvinyl chloride paste) and 50 parts of a 10 percent by weight ethyl acetate solution of a copolymer of ethyl acrylate and butyl acrylate (9:1) having a molecular weight of 290,000 were mixed together and the mixed solution was spread on a raised cotton cloth and dried as in Example 1. The artificial leather thus obtained had no gas permeability and had a hard touch so that it was entirely unsuitable for practical use.

REFERENTIAL EXAMPLE 2

Each of the elastomers employed in Experimental Examples (A) to (F) was mixed with various high molecular compounds other than polyamino acid as shown in Table 4 and each of the resulting mixtures was spread on a raised cotton cloth and dried according to Example 1. From homogeneous solutions and heterogeneous mixtures, all of the leather-like materials obtained had no gas permeability, as shown in Table 4.

REFERENTIAL EXAMPLE 3

A heterogeneous mixture could not be prepared even by mixing a 10 percent by weight 1,2-dichloroethane solution of poly-γ-methyl-D-glutamate as in Experimental Example (A) and a 30 percent by weight 1,2-dichloroethane solution of "Epon No. 1001" (trade name, a product of Shell International Chemical Co., Inc., epoxy resin) in any proportion. The mixed solution was spread on a raised cotton cloth and dried as in Example 1. The product obtained had no gas permeability. Also, when the "Epon No. 1001" was more than 50 percent by weight of solid material, leather like material could not be obtained.

REFERENTIAL EXAMPLE 4

A 10 percent by weight 1,2-dichloroethane solution of poly-γ-isopropyl-D-glutamate and a solution of acrylic ester copolymer (molecular weight: 185,000) which had been prepared by radical polymerization of a mixture of 5 parts acrylic acid, 3 parts acrylic acid β-hydroxyethyl ether, 3 parts acrylamide, 30 parts ethyl acrylate and 59 parts butyl acrylate at a 30 percent by weight concentration in 1,2-dichloroethane for 2 hours at 80°C in the presence of benzoyl peroxide as catalyst were mixed at a proportion of 1:2. The homogeneous and clear solution was spread on a raised cotton cloth and dried as in Example 1. The artificial leather obtained had no gas permeability.

Table 2

| Run No. | The applied amount of the mixed solution (B) | Application of second layer | | Properties of artificial leather | | | Gas permeability | Moisture permeability |
|---|---|---|---|---|---|---|---|---|
| | | Mixed solution | The applied amount | Touch | Scratching resistance[b] | Bending resistance[c] | | |
| 1 | 500 g/m² | (A) | 300 g/m²[a] | soft and calf leather like | more than 5000 cycles | 50,000 cycles | good | 3,900 g/m²/24hrs |
| 2 | do. | (C) | do. | do. | do. | do. | very good | 6,100 g/m²/24hrs |
| 3 | do. | (D) | do. | slightly stiff and natural leather like | do. | 100,000 cycles | do. | 2,800 g/m²/24hrs |
| 4 | do. | (E) | do. | soft and natural leather like | do. | 70,000 cycles | do. | 4,400 g/m²/24hrs |
| 5 | do. | (F) | do. | smooth and natural leather like | do. | 20,000 cycles | do. | 2,300 g/m²/24hrs |
| 6 | do. | (G) | do. | slimy and natural leather like | more than 7000 cycles | 10,000 cycles | good | 5,400 g/m²/24hrs |

[a] the applied amount of solution was expressed in wet state, g/m²
[b] measured according to Japanese Industrial Standards K-6772 with a Scott type scratching resistance tester
[c] measured according to ASTM D-2097-67T with Flexo meter type bending resistance tester Table 3

| Parts of poly-γ-methyl-D-glutamate solution | Parts of polyacrylic ester resin solution * | Rate of solid matter ** | State of the mixed solution | Gas permeability of artificial leather | Touch of artificial leather | Remarks |
|---|---|---|---|---|---|---|
| 10 parts | 90 parts | 3.6% | homogeneous and clear | bad | tacky | control |
| 40 | 60 | 18.2 | do. | do. | soft and cervine leather like | do. |
| 60 | 30 | 40.0 | heterogeneous and unclear | good | do. | The present invention |
| 70 | 20 | 53.8 | do. | do. | do. | do. |
| 80 | 10 | 72.7 | do. | do. | natural leather like | do. |
| 100 | 5 | 87.0 | homogeneous and clear | bad | do. | control |

*The solid material of "COPONYL KN-12" was again dissolved in 1,2-dichloroethane
**Weight ratio of poly-γ-methyl-D-glutamate to polyacrylic ester in solid matter Table 4

| Mixed solution of elastomer and polymer other than polyamino acid and artificial leather applied | | | | | | | |
|---|---|---|---|---|---|---|---|
| Elastomer | The blended polymer | Ratio by solid material | Solvent | Conc. of solid material | State of the mixed solution | Gas permeability of artificial leather | Feeling |
| Thermosetting polyurethane(1) | Polyvinyl chloride (8) | 1/1 | tetrahydrofuran | 15wt% | heterogeneous | none | hard and stiff |
| Cross-linking polyurethane(2) | methylpolyacrylate (9) | do. | ethyl acetate | 20 | do. | do. | too hard to use |
| Polyacrylic ester(3) | epoxy resin(10) | 2/1 | 1,2-dichloroethane | 30 | homogeneous and clear | do. | hard and tacky |
| "NEOPRENE | polyester resin(11) | do. | do. | do. | heterogeneous | do. | poor leather |

Table 4-continued

| Mixed solution of elastomer and polymer other than polyamino acid and artificial leather applied | | | | | | | |
|---|---|---|---|---|---|---|---|
| Elastomer | The blended polymer | Ratio by solid material | Solvent | Conc. of solid material | State of the mixed solution | Gas permeability of artificial leather | Feeling |
| AD" (4) | | | | | | | like feeling |
| NBR (5) | cellulose triacetate | do. | methylene chloride | 15 | do. | do. | very tacky |
| SBR (6) | polycarbonate resin (12) | do. | 1,2-dichloro-ethane | do. | do. | do. | do. |
| "HYPALON-20" (7) | polyester resin(11) | do. | do. | 30 | heterogeneous and unclear | do. | do. |

(1) "PARAPRENE PELLET 22S" (a product of Nippon Polyurethane Industry Co., Ltd.)
(2) "NIPPOLAN 5032-CORONATE" (a product of Nippon Polyurethane Industry Co., Ltd.)
(3) the same one as in Referential Example 1
(4) A product of E. I. du Pont de Nemours & Co., Inc.
(5) "JSR N-230S" (a product of Japan Synthetic Rubber Co., Ltd.)
(6) "JSR 1500" (a product of Nippon Polyurethane Industry Co., Ltd.)
(7) A product of E. I. du Pont de Nemours & Co., Inc.
(8) "Geon 121" (a product of the Japanese Geon Co., Ltd.)
(9) molecular weight 183,000
(10) "Epon No. 1001" (a product of Shell International Chemical Co., Inc.)
(11) "ESTER RESIN 20" (a product of Toyobo Co., Ltd.)
(12) "PANLITE L-1250" (a product of Teijin Chemicals Limited)

What we claim is:
1. A process of preparing a porous, leather-like material which comprises:
   a. coating or impregnating a fibrous base with a heterogeneous mixture of a liquid carrier and two polymers,
      1. said polymers being a polyamino acid and an elastomer respectively,
      2. at least one of said polymers being present in said mixture as a dispersed, separate phase,
      3. said mixture containing 2 to 50 percent solid matter by weight, and having a viscosity of 10 to 100,000 centipoises,
      4. the weight ratio of said polyamino acid to said elastomer in said solid matter being between 9:1 and 1:9; and
   b. drying the coated or impregnated sheet material until said carrier is substantially completely removed.
2. A process as set forth in claim 1, wherein said polyamino acid is a homopolymer of an amino acid or a copolymer of at least two different amino acids.
3. A process as set forth in claim 2, wherein said polyamino acid is a polymer of at least one amino acid selected from the group consisting of glycine, alanine, leucine, isoleucine, valine, methionine, phenylalanine, γ-alkyl aspartate, γ-alkyl glutamate, δ-acylornithine, ε-acyllysine, o-benzylserine, o-acylserine, o-acylthreonine, o-benzylthyrosine, s-benzylcysteine and β-alanine.
4. A process as set forth in claim 1, wherein said elastomer has a second order transition point below ordinary temperature.
5. A process as set forth in claim 4, wherein said elastomer is selected from the group consisting of natural rubber, acrylonitrile-butadiene rubber, styrene-butadiene rubber, polyisoprene, neoprene rubber, chlorosulphonated polyethylene, polyurethane, polyacrylic ester, methoxymethylated nylon-6 and mixtures thereof.
6. A process as set forth in claim 1, wherein said base is a woven cloth, non-woven cloth, or knitted cloth.
7. A process as set forth in claim 1, wherein said carrier is an organic solvent.

* * * * *